(12) United States Patent
Kagaya et al.

(10) Patent No.: US 7,881,504 B2
(45) Date of Patent: Feb. 1, 2011

(54) PERSON IMAGE CORRECTING APPARATUS AND METHOD

(75) Inventors: Makoto Kagaya, Kanagawa (JP); Yoshiya Ohara, Kanagawa (JP); Masahiro Kubo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1109 days.

(21) Appl. No.: 11/524,297

(22) Filed: Sep. 21, 2006

(65) Prior Publication Data

US 2007/0092153 A1 Apr. 26, 2007

(30) Foreign Application Priority Data

Sep. 21, 2005 (JP) ............................. 2005-273706

(51) Int. Cl.
G06K 9/00 (2006.01)
G06K 9/40 (2006.01)
(52) U.S. Cl. .................. 382/118; 382/162; 382/164; 382/254
(58) Field of Classification Search ............... 382/118, 382/164, 254
See application file for complete search history.

(56) References Cited

U.S. PATENT DOCUMENTS

| | | | | |
|---|---|---|---|---|
| 5,420,630 | A * | 5/1995 | Takei | 348/223.1 |
| 5,467,168 | A * | 11/1995 | Kinjo et al. | 355/77 |
| 5,497,431 | A * | 3/1996 | Nakamura | 382/162 |
| 5,850,463 | A * | 12/1998 | Horii | 382/118 |
| 5,850,470 | A * | 12/1998 | Kung et al. | 382/157 |
| 5,881,171 | A * | 3/1999 | Kinjo | 382/199 |
| 6,445,819 | B1 * | 9/2002 | Kinjo | 382/173 |
| 6,526,161 | B1 * | 2/2003 | Yan | 382/118 |
| 6,633,689 | B2 * | 10/2003 | Yamamoto | 382/309 |
| 6,829,432 | B2 * | 12/2004 | Misumi et al. | 396/1 |
| 6,834,127 | B1 * | 12/2004 | Yamamoto | 382/282 |
| 6,885,761 | B2 * | 4/2005 | Kage | 382/118 |

(Continued)

FOREIGN PATENT DOCUMENTS

JP 06-208178 7/1994

(Continued)

OTHER PUBLICATIONS

Japanese Office Action dated Aug. 3, 2010, corresponding to Japanese Patent Application No. 2005-273706.

*Primary Examiner*—Bhavesh M Mehta
*Assistant Examiner*—Gandhi Thirugnanam
(74) *Attorney, Agent, or Firm*—Sughrue Mion, PLLC

(57) ABSTRACT

A person image correcting apparatus and a person image correcting method that reproduce face colors of persons in an image group consisting of a plurality of images shot under identical shooting conditions, with an appropriate color and/or density, prevent variations in the background colors, and effectively perform correcting process, even if the image group contains an image of a person having a significantly different face color from other persons, are proposed. Two or more display images that are different in face color are selected from the plurality of person images, based on a feature amount in a face region, and displayed. When a modification value of color or density is inputted, all of the display images are corrected using the inputted modification value, and the corrected images are redisplayed. When an instruction for confirming the modification value is inputted, all of the plurality of person images are corrected and outputted.

6 Claims, 9 Drawing Sheets

U.S. PATENT DOCUMENTS

| | | | |
|---|---|---|---|
| 6,975,759 B2 * | 12/2005 | Lin | 382/167 |
| 7,039,222 B2 * | 5/2006 | Simon et al. | 382/118 |
| 7,630,630 B2 * | 12/2009 | Kagaya | 396/661 |
| 7,730,043 B1 * | 6/2010 | Bourdev | 707/695 |
| 2001/0005427 A1 | 6/2001 | Takemoto | |
| 2002/0015514 A1 * | 2/2002 | Kinjo | 382/118 |
| 2002/0081003 A1 * | 6/2002 | Sobol | 382/118 |
| 2003/0059092 A1 * | 3/2003 | Okubo et al. | 382/118 |
| 2003/0108223 A1 * | 6/2003 | Prokoski | 382/115 |
| 2004/0017930 A1 * | 1/2004 | Kim et al. | 382/103 |
| 2004/0022423 A1 * | 2/2004 | Chen et al. | 382/118 |
| 2004/0228504 A1 * | 11/2004 | Chang | 382/118 |
| 2004/0228528 A1 * | 11/2004 | Lao | 382/167 |
| 2005/0008246 A1 * | 1/2005 | Kinjo | 382/254 |
| 2005/0129331 A1 * | 6/2005 | Kakiuchi et al. | 382/275 |
| 2006/0008173 A1 * | 1/2006 | Matsugu et al. | 382/274 |
| 2006/0153429 A1 * | 7/2006 | Gehlen et al. | 382/118 |
| 2006/0204055 A1 * | 9/2006 | Steinberg et al. | 382/118 |
| 2006/0204057 A1 * | 9/2006 | Steinberg | 382/118 |
| 2007/0071316 A1 * | 3/2007 | Kubo | 382/162 |
| 2007/0092153 A1 * | 4/2007 | Kagaya et al. | 382/254 |
| 2009/0316168 A1 * | 12/2009 | Enjuji | 358/1.9 |

FOREIGN PATENT DOCUMENTS

| | | |
|---|---|---|
| JP | 2000-182043 | 6/2000 |
| JP | 2000-196890 | 7/2000 |
| JP | 2001-251531 A | 9/2001 |

* cited by examiner

PERSON IMAGE CORRECTING APPARATUS AND METHOD

The entire contents of documents cited in this specification are incorporated herein by reference.

BACKGROUND OF THE INVENTION

The present invention generally relates to image processing technologies. More particularly, the invention relates to image correcting apparatuses and methods that correct images on which persons are photographed.

In preparing photo prints from digital image data, which is, for example, acquired by photo shooting with a digital camera, or obtained by photo-reading of an image printed on a photo film, correction may be performed on the images so that the images are reproduced with appropriate colors and densities. In particular, when it comes to images on which persons are photographed, it is significantly important to reproduce face colors appropriately.

There have been known image processing methods that place an importance on skin colors of persons, including, for example, a technology (refer to JP 2000-196890 A) in which a person face is automatically extracted from image data and the data is corrected so that a skin color of the face area achieves a target range of density, and a technology (refer to JP 2000-182043 A) in which a person face is automatically extracted from image data and the data is corrected so that a skin color of the face area achieves a target chromaticity.

In these technologies, a target density and/or a target chromaticity of skin colors are pre-set and the images are corrected respectively in such a manner that the density and/or color of the face regions extracted from the image data are close to the target values. Accordingly substantially appropriate correction can be performed as long as the persons on the images to be corrected are from the same race as is used in presetting the target values of density and chromaticity of skin colors.

However, considering that different persons from different races have different skin colors, there may be problems if a certain color and/or density is used as a skin color target for correcting all the images of an image group, when the images include different persons from a plurality of races and are shot under identical shooting conditions (such as class book photos). For example, there may be inconsistency in background colors among the images or skin color tint may not always be appropriately reproduced. Therefore, it is desirable to perform identical correction to an image group consisting of such a plurality of images.

In JP 6-208178 A, on the other hand, a photo printing method for printing a plurality of image frames that have been shot on a photo film by a camera with an auto-exposure function, using so-called direct exposure photo printing in which an image shot on a photo film is projected and exposed onto a photosensitive material (photographic paper) is described. In this method each of the plurality of image frames is divided into multiple pieces and subjected to photometry. According to the result of the photometry, an identical exposure amount is determined. Images equivalent to print images that would be obtained by printing the image frames using the predetermined identical exposure amount are displayed on an image display unit. One or more displayed image frames are checked and modified to determine a modification exposure amount for the image frames. Based on the identical exposure amount and the modification exposure amount, a printing exposure amount for the image frames is determined. Using the printing exposure amount thus obtained, the plurality of image frames are printed onto a sheet of photographic paper.

According to the method, one or more frames (including all frames) out of the images contained in the same film can be displayed on the image display unit to determine a modification exposure amount for each of the images. The modification exposure amounts are averaged to determine the printing exposure amount, which is then used for printing all the images in the film. Therefore, possible variations in the background colors among the images shot under identical shooting conditions can be prevented.

However, if modification exposure amounts are determined for all of the images contained in a film, one by one, a significant time is required for the process of checking and determining modification values for the displayed images. On the other hand, if the modification exposure amount is determined using only one frame, such amount may not reproduce skin colors with appropriate color and/or density for other frames, in particular, in case where persons from different races having different face colors mixedly exist in the frames.

SUMMARY OF THE INVENTION

In view of the above problems, it is an object of the present invention to solve the problems and to provide a person image correcting apparatus and method that reproduce face colors of persons in an image group consisting of a plurality of images shot under identical shooting conditions, with an appropriate color and/or density, prevent variations in the background colors, and effectively perform correcting process, even if the image group contains an image of a person having a significantly different face color from other persons.

The present invention has been made to achieve the aforementioned object and to provide a person image correcting apparatus for correcting a plurality of person images that are shot under identical shooting conditions, the person image correcting apparatus including:

a face region extracting unit for extracting a face region of the person images that are inputted;

a display image selecting unit for automatically selecting two or more display images out of the plurality of person images, based on a feature amount in the face region extracted by the face region extracting unit;

a modification value input unit for receiving input of modification values of at least one of color and density;

a modification value confirming unit for receiving confirmation of the modification values;

an image correcting unit for correcting the display images using the modification values inputted from the modification value input unit, and for correcting the person images using the modification values confirmed by the modification value confirming unit so that the person images that have been corrected are generated; and an image display unit for displaying the display images corrected by the image correcting unit.

It is preferable for the person image correcting apparatus to further include a correction value auto-calculating unit for automatically calculating correction values of at least one of color and density based on a feature amount of the face region extracted by the face region extracting unit, in which the image correcting unit uses the correction values calculated by the correction value auto-calculating unit and the modification values inputted by the modification value input unit to correct the display images and the person images.

Preferably, the display image selecting unit uses the feature amount in the face regions to select two or more display images that are different in density or color in the face regions, and the image display unit displays the display images in such a manner that the display images are arranged in an order of density or color.

It is preferable for the person image correcting apparatus to further include a segmentation confirmation unit for dividing the display images and the person images into two or more groups by using, as a boundary, the feature amount corresponding to an instruction inputted, in which the modification value input unit receives input of the modification values for the respective display image groups divided by the segmentation confirming unit, and in which the image correcting unit uses the modification values inputted by the modification value input unit to correct the corresponding divided display image group and uses the modification values confirmed by the modification value confirming unit to correct the corresponding divided person image group, so that the person images that have been corrected are generated.

The present invention also provides a person image correcting method including the steps of:

inputting a plurality of person images that are shot under identical shooting conditions;

extracting a face region for each of the inputted plurality of person images;

selecting two or more display images out of the plurality of person images based on a feature amount in the extracted face region;

correcting the display images by using modification values of at least one of color and density that are inputted;

displaying, on an image display unit, the display images that have been corrected;

in response to an instruction of confirmation of the modification values, correcting the plurality of person images by using the modification values; and outputting the person images that have been corrected.

It is preferable for the person image correcting method to further include the step of calculating correction values of at least one of color and density based on a feature amount of the extracted face region, in which the steps of correcting the display images and correcting the plurality of person images use the correction values and the modification values to correct the display images and the person images.

Preferably, the step of selecting the display images uses a feature amount in the face regions to select two or more display images that are different in density or color in the face regions, and the displaying step displays the display images on an image display unit in such a manner that the display images are arranged in an order of density or color.

It is preferable for the person image correcting method to further include the step of dividing the display images and the person images into two or more groups using, as a boundary, the feature amount corresponding to the input instruction, in which the steps of correcting the display images and correcting the plurality of person images use the modification values inputted for each of the divided display image groups to correct the corresponding divided display image group and the corresponding divided person image group.

As described above, the present invention allows, reproducing face colors of persons in an image group consisting of a plurality of images shot under identical shooting conditions, with an appropriate color and density, preventing variations in the background colors, and efficiently performing correcting process, even if the image group contains an image of a person having a significantly different face color from other persons.

DETAILED DESCRIPTION OF THE INVENTION

The person image correcting apparatus and method according to the present invention will be described below in detail by referring to the preferred embodiments shown in the attached drawings.

Figure 1:
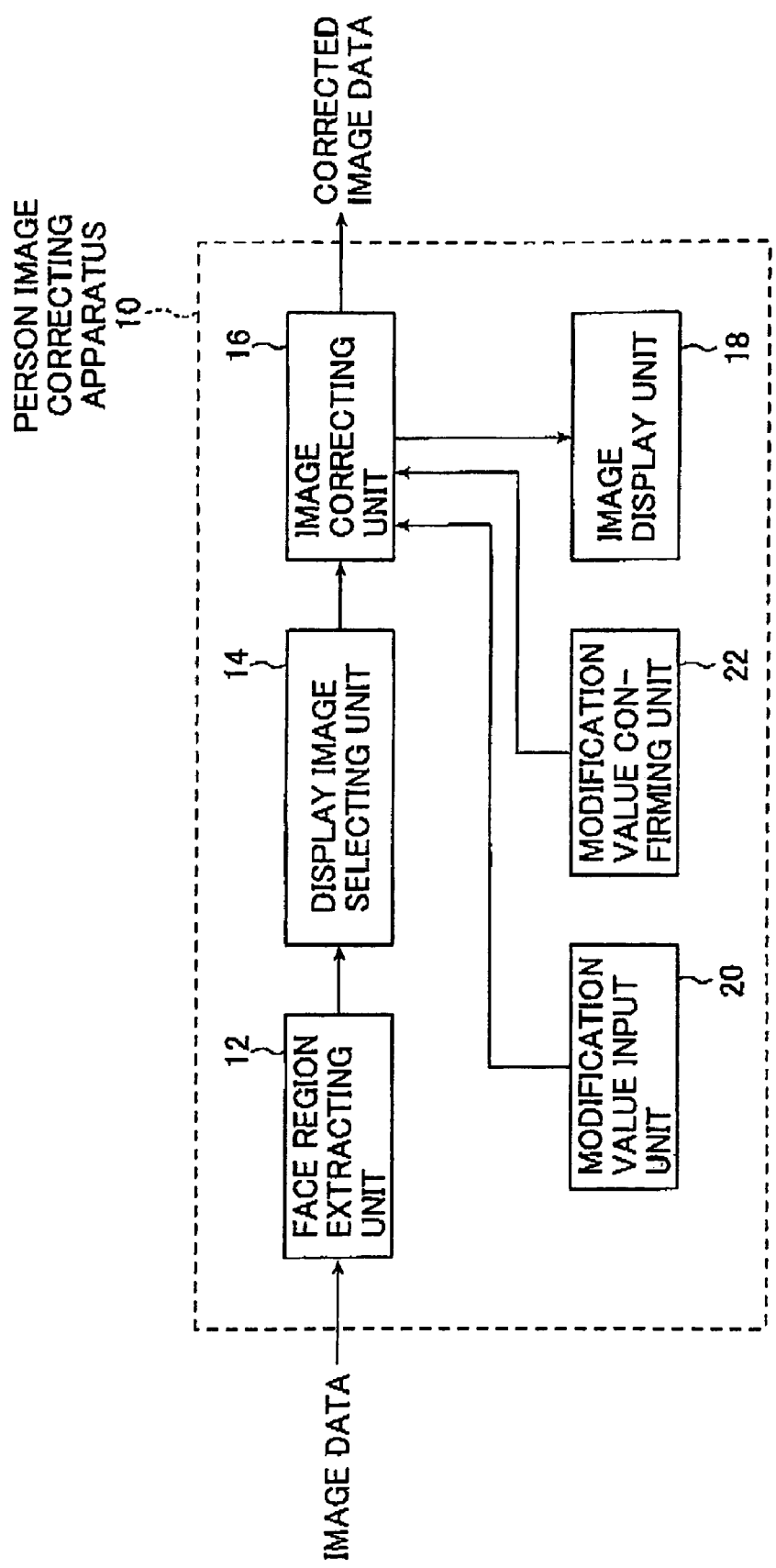
FIG. 1 is a block diagram showing an embodiment of the person image correcting apparatus of the present invention.

FIG. 1 is a block diagram showing an embodiment of the person image correcting apparatus of the present invention.

In FIG. 1, a person image correcting apparatus 10, upon receiving a plurality of person images (image data) shot under identical shooting conditions, carries out an identical correction to the inputted plurality of person images and outputs person images that have been corrected (corrected image data).

The person image correcting apparatus 10 includes a face region extracting unit 12, a display image selecting unit 14, an image correcting unit 16, an image display unit 18, a modification value input unit 20, and a modification value confirming unit 22.

The face region extracting unit 12 extracts a face region from each inputted image.

The display image selecting unit 14 automatically selects a plurality of display images (images to be displayed) out of the plurality of person images, using a feature amount obtained from the extracted face region as the base for selection.

The image correcting unit 16 corrects the plurality of display images selected by the display image selecting unit 14 using modification values inputted from the modification value input unit 20 and supplies the corrected display images to the image display unit 18. Also, the image correcting unit 16 corrects all of the plurality of person images that are inputted to the person image correcting apparatus 10 using modification values confirmed by the modification value confirming unit 22 and outputs the corrected person images.

The face region extracting unit 12, the display image selecting unit 14, and the image correcting unit 16 can be configured by hardware or software that executes predetermined computing processing, The image display unit 18 is employed for displaying the display images supplied from the image correcting unit 16. The image display unit 18 displays the supplied plurality of display images by arranging them on one screen.

The modification value input unit 20 receives input of modification values of at least one of color and density for the images displayed on the image display unit 18, and the modification value confirming unit 22 receives confirmation of the modification values. As the modification value input unit 20 and the modification value confirming unit 22, various input devices may be used, for example, pointing devices such as a mouse, keyboards, or touch panels incorporated in the image display unit 18.

A description of person image correcting processing performed in the person image correcting apparatus 10 will be given below according to the flow chart shown in FIG. 2.

In the person image correcting apparatus 10, when a plurality of person images shot under identical shooting conditions are inputted to the face region extracting unit 12 (step S101), the face region extracting unit 12 extracts face regions from the inputted plurality of person images respectively (step S102). Examples of specific methods that can be employed for extracting face regions include a method described in JP 8-122944 A in which a color original image is segmented based on a histogram of hue values, and from the segmented regions, a face region is selected based on such as camera information, and a method described in 5-100328 A in which a face region is determined by detecting shape patterns of such as head contour or face contour of a person on the image.

Next, the display image selecting unit 14 calculates a feature amount in the face region extracted by the face region extracting unit 12, and selects a part of the inputted plurality of person images (person image group) as the display images (step S103).

When selecting images as the display images, it is important to select images that are significant in terms of determining modification values, so that even if only a part of the inputted plurality of person images are checked and confirmed on the image display unit 18, modification values appropriate for all of the images can be efficiently determined.

The images significant in terms of determining modification values are, in other words, the images having distinguishing features effective to determine whether or not appropriate correction is performed for all the images in the image group. Such images preferably contain images having average face colors and images having extreme face colors that are significantly different from the average face colors in the image group. More specifically, it is preferable to use, images having a face region of an average density or of an average color, images having a brightest face region (lower density), and images having a darkest face region (higher density), or a set of two images having face regions with face colors extremely opposite to each other.

While there are various combinations of images that are considered appropriate as the display images as described above, seven faces including the most average face, the brightest face, the darkest face, the most reddish face, the most bluish face, the most yellowish face, and the most cyanish face are selected in this embodiment. However, the present invention is not limited to this, and any features may be employed as long as they are effective in terms of determination of modification values.

The images selected as the display images are displayed by the display image selecting unit 14 on a monitor screen at the same time for the purpose of confirming the correction result. At that time, if too many images are displayed, it is difficult to determine which image to focus, thus making it difficult to determine appropriateness of correction. On the other hand, if only one frame among the plurality of person images is displayed and modification values are determined so as to appropriately correct the displayed frame, such modification values may not be appropriate for other images.

For this reason, the number of images to be selected as the display images is set to at least two, and the maximum number of images is set according to the size of the screen so as not to prevent accurate determination. For example, 20 images are preferable as the maximum number of images to be displayed at the same time. If the person image group includes a small number of images, all of the images may be selected as the display images.

In this way, among a plurality of images, selecting and displaying a limited number of images that have distinguishing features in terms of density or color (for example, an average image and images having most extreme features deviating from the average most), facilitate determination of appropriateness of correction, because only a limited number of display images are needed to be focused. Moreover, if the correction is appropriate for the images displayed, it is also appropriate for other images having colors or densities in-between. Therefore, appropriate correction can be achieved for all of the images.

In step S103, the display image selecting unit 14 selects display images as described above by using the feature amount in the face region.

The display image selecting unit 14 first calculates a feature amount in the respective face regions of all of the inputted plurality of person images.

In this embodiment, average values (Rfi, Gfi, Bfi) of RGB data values in the face region of the i-th person image are calculated as an example.

Then, using the calculated average values, (Rfi, Gfi, Bfi) of RGB data values in the face region, brightness Yfi in the face region is calculated according to formula (1) below, $$Yfi = 0.299 \times Rfi + 0.587 \times Gfi + 0.114 \times Bfi \tag{1}$$

Upon completion of face region feature amount calculation for all of the person images, faces to be displayed are selected according to selection criteria shown in Table 1. In the selection criteria shown in Table 1, Ei is a number calculable in formula (2) below.

$$Ei = \{(Rfi-Rfav)^2 + (Gfi-Gfav)^2 + (Bfi-Bfav)^2\}^{0.5} \tag{2}$$

In the above formula, (Rfav, Gfav, Bfav) represent average values of (Rfi, Gfi, Bfi)(i=1, 2, 3, ..., N), and Ei represents deviation of each image from the average value of all of the plurality person images. If Ei is smaller, the image is nearer to the average value, indicating that the image has a face region of an average color tint.

TABLE 1

| No | Face | Selection Criteria |
|---|---|---|
| 1 | Most average face | Image having smallest Ei |
| 2 | Brightest face | Image having largest Yfi |
| 3 | Darkest face | Image having smallest Yfi |
| 4 | Most reddish face | Image having largest Rfi/Yfi |
| 5 | Most bluish face | Image having largest Bfi/Yfi |

TABLE 1-continued

| No | Face | Selection Criteria |
|---|---|---|
| 6 | Most yellowish face | Image having smallest Bfi/Yfi |
| 7 | Most cyanish face | Image having smallest Rfi/Yfi |

The reason why the display images can be selected using the above selection criteria which is based on the feature amount in the face region of the inputted images is because, with respect to the person images shot under identical shooting conditions, relative relation of data among the images is substantially equal to relative relation of skin color among the persons photographed. In other words, for example, a person having the brightest face appears to have the brightest face on the image data also.

It should be noted that the method of selecting the display images in the display image selecting unit 14 is not limited to the above, and other suitable methods may be used. For example, values (Lfi, afi, bfi) that are obtained by converting the average values (Rfi, Gfi, Bfi) of RGB data values in the face region into L* a* b* data values, may be used as the face region feature amount and selection may be performed based on the selection criteria shown in Table 2 below. In the selection criteria shown in Table 2, Ei is a number calculable formula (3) below.

$$Ei = \{(Lfi-Lfav)^2 + (afi-afav)^2 + (bfi-bfav)^2\}^{0.5} \quad (3)$$

In the above formula, (Lfav, afav, bfav) represent average values of (Lfi, afi, bfi)(i=1,2,3, . . ., N). Similarly to the above example, Ei represents deviation of each image from the average value of all of the plurality person images.

TABLE 2

| No | Face | Selection Criteria |
|---|---|---|
| 1 | Most average face | Image having smallest Ei |
| 2 | Brightest face | Image having largest Lfi |
| 3 | Darkest face | Image having smallest Lfi |
| 4 | Most reddish face | Image having largest afi |
| 5 | Most bluish face | Image having smallest bfi |
| 6 | Most yellowish face | Image having largest bfi |
| 7 | Most cyanish face | Image having smallest afi |

When display images are selected, the image correcting unit 16 corrects all of the selected display images using current modification values (step S104).

In the image correcting unit 16, modification values consist of four parameters (D, C, M, Y), and the modification value input unit 20 inputs modification values for these four parameters to the image correcting unit 16. Parameter D represents density, and parameters C, M, and Y, represent color tint of cyan, magenta, and yellow respectively.

Modification values (D, C, M, Y) are initially all set to 0 (zero) as initial values. Therefore, when the process of step S104 is performed for the first time, the display images are not actually corrected. Accordingly, the correction process of step S104 may be skipped when performed for the first time.

Also in step S104, the display images are corrected and the corrected display images are produced. Therefore, if the image size required for display is smaller than the size of the inputted image, a reduced display image may be used for correction in step S104. The reduced display image of the selected image, being reduced to the display image size is generated and stored in, such as, a memory previously. This allows reduction in load and enhancement in throughput during image correcting process in step S104.

One example of specific image correction process performed in step S104 is described below.

In this embodiment, modification values (D, C, M, Y) inputted from the modification value input unit 20 are logarithms. In addition, an increase or decrease in density D is set such that the increase or decrease in density D is equivalent to an increase or decrease in all of the C, M, Y equally.

The image correcting unit 16 first converts the modification values (D, C, M, Y) of logarithms inputted from the modification value input unit 20 into modification values (gainR, gainG, gainB) of antilogarithms using following formula (4) below.

$$\left.\begin{array}{l} \text{gain } R = 10^{\wedge}\{-(D+C) \times 0.01\} \\ \text{gain } G = 10^{\wedge}\{-(D+M) \times 0.01\} \\ \text{gain } B = 10^{\wedge}\{-(D+Y) \times 0.01\} \end{array}\right\} \quad (4)$$

In formula (4), 0.01 is a coefficient corresponding to the input width of the modification values from the modification value input unit 20.

In this case, since the initial values for the modification values (D, C, M, Y) are all set to 0 (zero), the values (gainR, gaingG, gainB) at that time are all 1.

Further, the image correcting unit 16 converts the data values (pixel values) of the inputted person images into liner luminance signals For example, in case the input data is 8 bit, if values obtained by dividing the input data values by 255 are (Rin, Gin, Bin), lr0 for Rin is calculated using formula (5) or (6) below.

$$lr0 = \begin{cases} \left(\dfrac{Rin + 0.055}{1.055}\right)^2 & (Rin \geq 0.04045) \quad (5) \\ \dfrac{Rin}{12.92} & (Rin < 0.04045) \quad (6) \end{cases}$$

lg0 and lb0 are also calculated using similar formulas.

The signals (lr0, lg0, lb0) as obtained in the above are subjected to correction (gain correction) using the modification values (gainR, gainG, gainB) of antilogarithms to obtain (lr1, lg1, lb1).

$$\left.\begin{array}{l} lr1 = lr0 \times \text{gain } R \\ lg1 = lg0 \times \text{gain } G \\ lb1 = lb0 \times \text{gain } B \end{array}\right\} \quad (7)$$

Finally, the corrected signals (lr1, lg1, lb1) are again converted into signals multiplied by gamma, to obtain values (Rout, Gout, Bout). For lr1, Rout is calculated using the following formula (8) or (9).

$$Rout = \begin{cases} 1.055 \times lr1^{(1.0/2.4)} - 0.055 & (lr1 \geq 0.0031308) \quad (8) \\ 12.92 \times lr1 & (lr1 < 0.0031308) \quad (9) \end{cases}$$

Using similar formulas, Gout and Bout are calculated.

Then, if the corrected images are to be 8 bit, for example, Rout, Gout, and Bout are multiplied by 255 to obtain output data values.

In the above, the input data values (and corresponding Rin, Gin, Bin) and the output data values (and corresponding Rout, Gout, Bout) are for one pixel. Therefore, similar calculation is repeated for all of the pixels of the image to be corrected.

In this manner, image correction is performed by the image correcting unit 16 using the modification values inputted by the modification value input unit 20. Such correction process is performed for all of the display images selected by the display image selecting unit 14.

It should be noted that in this embodiment, the image data is processed according to the sRGB standard, however, other signaling standards (such as ITU-R, BT709) may be used. In such cases, appropriate formulas conforming to respective signaling standards may be used instead of using formulas (5), (6), which perform conversion from the input data values to linear luminance signals, or formulas (8), (9), which perform reverse conversion.

Upon completion of image correction in step S104, the image correcting unit 16 supplies display images that have been corrected (corrected display images) to the image display unit 18. The image display unit 18 displays the supplied corrected display images on a display screen (monitor) (S105).

When displaying the corrected display images on the display screen, the image display unit 18 may simply arrange the images according to such as input order, process order, or file number order, without considering the relation between images. However, it is desirable to arrange the images on the display screen in such a manner that relation among the images is easily identified.

Figure 3:
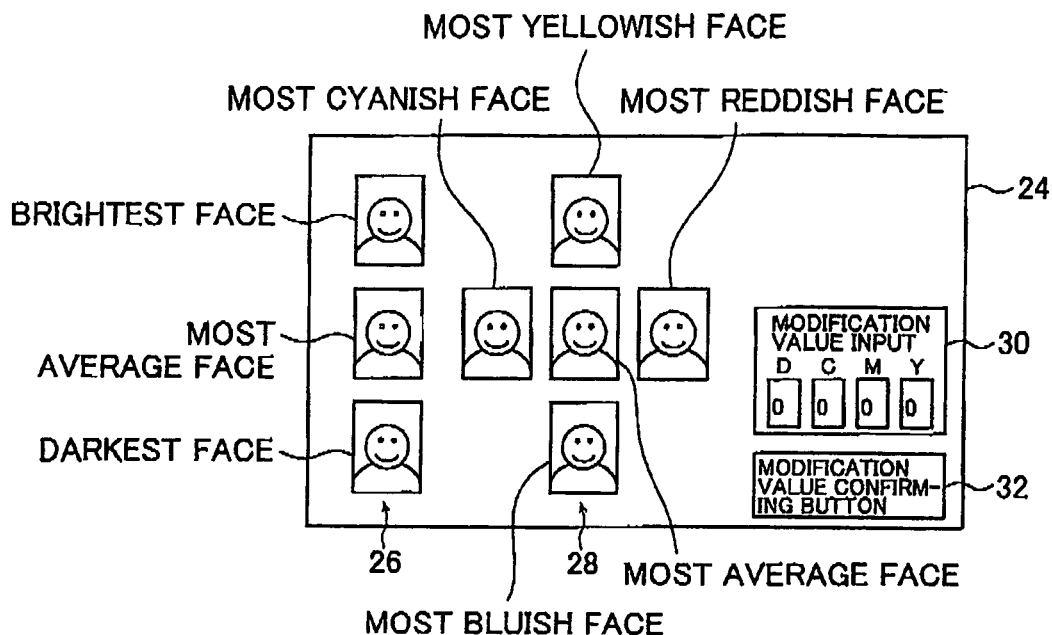
FIG. 3 is a schematic chart showing an example of a display screen.

FIG. 3 shows a preferred example of the display screen of the image display unit 18.

As described above, in step S103, the person images with 7 faces including the most average face, the brightest face, the darkest face, the most reddish face, the most bluish face, the most yellowish face, and the most cyanish face have been selected by the display image selecting unit 14. On the display screen 24 shown in FIG. 3, these person images (display images thereof) are displayed by being separated into a first display region 26 which is a display region according to density, and a second display region 28 which is a display region according to color.

In the first display region 26, the most average face image is positioned at the center of the screen, the brightest face image is positioned above it, and the darkest face image is positioned below it. In other words, the three face images are arranged in the order of brightness (density).

In the second display region 28, the most average face image is positioned at the center, the most yellowish face is positioned above it, the most bluish face is positioned below it, the most cyanish face image is positioned to the left of it, and the most reddish face image is positioned to the right of it. In other words, a set of complimentary colors such as yellow and blue, cyan and red are arranged opposingly to each other having a face image with most average color tint in between. This configuration of arrangement conforms to the L*a*b* color specification system. Since this type of display configuration is familiar to many operators, displaying in this configuration facilitates the operator to instantly identify the relation between individual images.

Therefore, it is useful to arrange the plurality of images selected as the display images by showing the relation of density and color, so as to easily understand the relation among the individual images.

In addition, a bias in distribution among images may be additionally displayed on the display screen 24 in FIG. 3.

For example, with respect to brightness, displaying a number which represents the number of images having faces brighter than the most average face, between the brightest face image and the most average face image, and displaying a number which represents the number of images having faces darker than the most average face, between the darkest face image and the most average face image, may facilitate easy understanding which is higher in the number, the brighter face images or darker face images.

With respect to color tint, the images may be displayed in a similar fashion.

When the display screen 24 appears on the monitor of the image display unit 18, the operator determines whether the correction of the images is appropriate or not by observing the display screen 24. An instruction according to the determination of the operator is inputted to the image correcting unit 16 either by the modification value input unit 20 or by the modification value confirming unit 22 (step S106). If the instruction is inputted by the modification value input unit 20, it is assumed that the result of the determination in step S106 is NO, and if the instruction is inputted by the modification value confirming unit 22, it is assumed that the result of the determination in step s106 is YES.

If the correction for the images displayed on the display screen 24 is not appropriate, modification values are inputted by the operator through the modification value input unit 20 (step S107).

A modification value input display section 30 is provided on the display screen 24 for displaying modification values for D, C, M, Y respectively. The values inputted through the modification value input unit 20 are displayed on the modification value input display section 30.

For example, for brighter (reduced) density, the value of D is reduced (set to a negative value, if the value is initially set to 0) by the correction value input unit 20. When the value of D is reduced, the image correcting unit 16 corrects the image to have a brighter (reduced) density. On the other hand, when the value of D is increased (set to a positive value, if the value is initially set to 0), the image correcting unit 16 corrects the images to have a darker (increased) density. In this manner, the density can be modified.

In addition, when the value of C is set to a positive value, the images are corrected to be more cyanish (stronger in cyan) and when the value of C is set to a negative value, the images are corrected to be more reddish. When the value of M is set to a positive value, the images are corrected to be more magentish, and when the value of M is set to a negative value, the images are corrected to be more greenish. When the value of Y is set to a positive value, the images are corrected to be more yellowish, and when the value is set to a negative value, the images are corrected to be more bluish. In this way, the color can be modified.

When modification values are inputted, the process returns to step S104 again, and the image correcting unit 16 uses the inputted modification values to correct all of the display images again to regenerate corrected display images. In this case, the same correction method as described above is used, and correction is performed on the display images (or on the reduced display images if previously stored) as selected in step S103 which have not gone through correction, using the modification values newly inputted in step S107.

The corrected display images thus regenerated are redisplayed on the monitor by the image display unit 18 (step S105). The operator determines whether the correction is appropriate or not by observing the corrected images that are redisplayed. Then, an instruction according to the determination of the operator is inputted to the image correcting unit 16 either through the modification value input unit 20, or through the modification value confirming unit 22 (step S106).

Steps S104 to S107 are repeated until an instruction that indicates the correction is appropriate is inputted.

If the correction is appropriate (becomes appropriate), the operator inputs an instruction to confirm the modification values through the modification value confirming unit 22, so that the modification values are confirmed (step S108).

On the display screen 24, a modification value confirming button 32 is displayed, and by clicking the modification value confirming button 32 through the modification value confirming unit 22, the instruction to confirm the modification values is inputted to the image correcting unit 16.

When the modification values are confirmed, the image correcting unit 16 uses the confirmed modification values to correct all of the plurality of personal images (step S109) and outputs images that have been corrected (corrected image data) (step S110).

Correction of the personal images in step S109 is performed in a similar way as used for correction of the display images in step S104.

As already described, in step S104 in which monitor display images are to be corrected, it is desirable to reduce the images to the display image size and correction is performed on the reduced display images. If it is the case, correction, in step S109, is performed on all of the personal images of original image size as inputted.

Alternatively, in step S104, it may also be appropriate to correct the display images of original size as inputted without any reduction. If it is the case, the display images that have been corrected can also be used as output images, and therefore correction may be performed only on the remaining images that have not gone through correction. In other words, correction is performed only on the images other than display images that have been corrected.

In this way, the person image correcting apparatus 10 of the present invention and the correcting method implemented therein, attain a configuration in which, among a plurality of person images shot under identical shooting conditions, only a limited number of images that include different faces with different face colors, are selected based on an feature amount in face regions, and displayed. This allows the operator to concentrate only on the limited number of display images when determining appropriateness of correction, and makes the determination process to become simple.

In addition, the present invention provides a configuration in which images which are important in determining modification values, i.e., images with distinguishing features in terms of density and color, are selected and displayed. Therefore, if the correction is appropriate with respect to the displayed images, it is assumed to be appropriate for other images, even if the faces that deviate significantly from others in face color are mixedly included in the images that are shot under identical shooting conditions. Modification values that enable appropriate correction for all the images thus can be obtained efficiently.

Further, when modification values for color and/or density are inputted, the values are applied to all of the displayed images, and the corrected images are redisplayed, so that appropriateness of the correction can be easily determined. In addition, one time entry of correction values enables all of the images to be corrected, thus improving efficiency in determining modification values.

As described heretofore, a plurality of person images can be corrected and reproduced with appropriate colors and/or densities, and possible variations in background colors can be appropriately prevented, while improving efficiency in determining modification values, and in performing correction.

While in the above example, modification values for both color and density are inputted, the present invention is not limited to this. Modification values for either one of color and density may be inputted, with which correction may be performed. In such cases, as the modification values for the one of parameters that are not inputted, certain appropriate values may be provided using conventional correction methods in which, for example, target values are predetermined.

Figure 4:
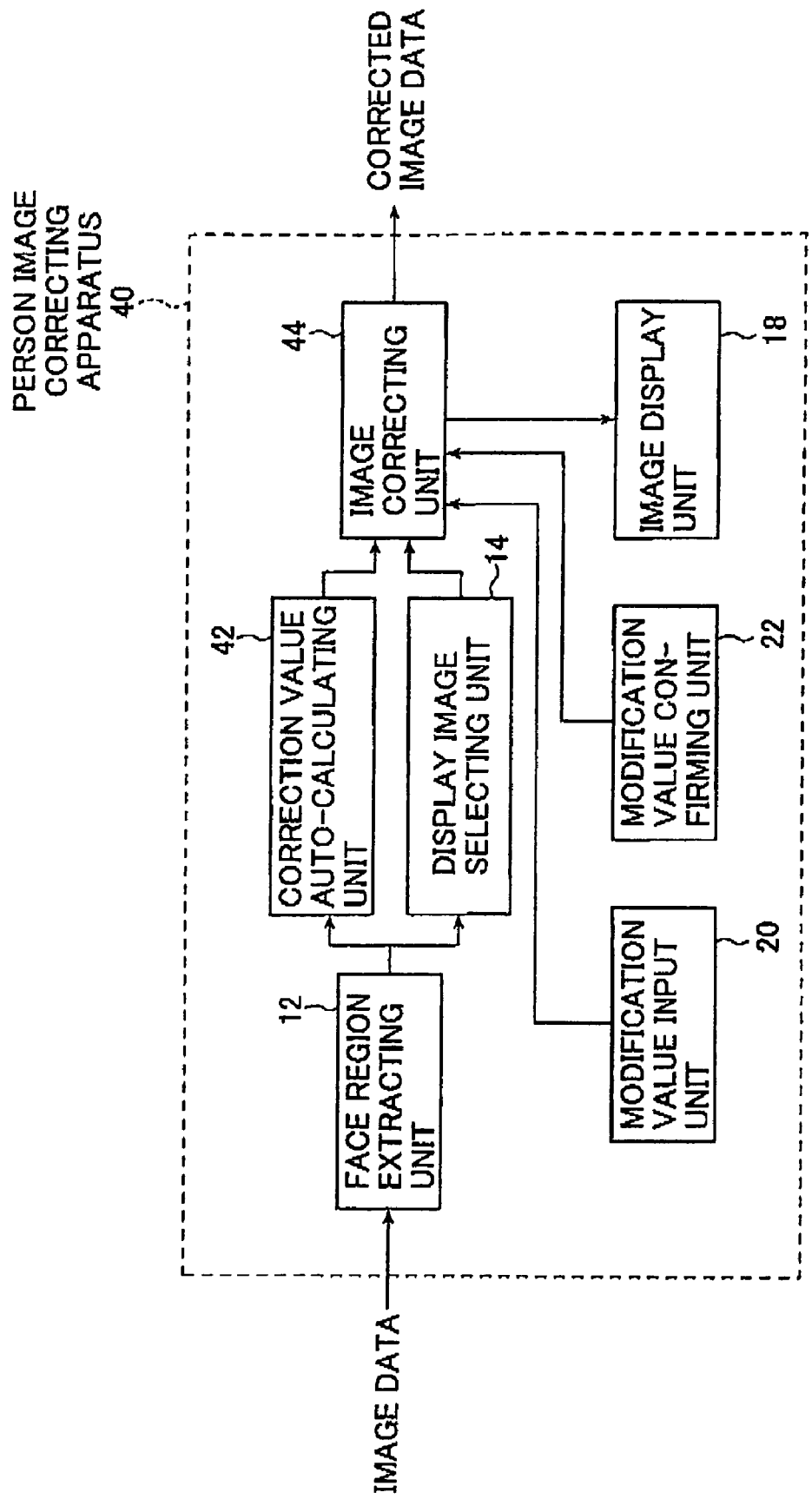
FIG. 4 is a block diagram showing another embodiment of the person image correcting apparatus according to the present invention.
Figure 5:
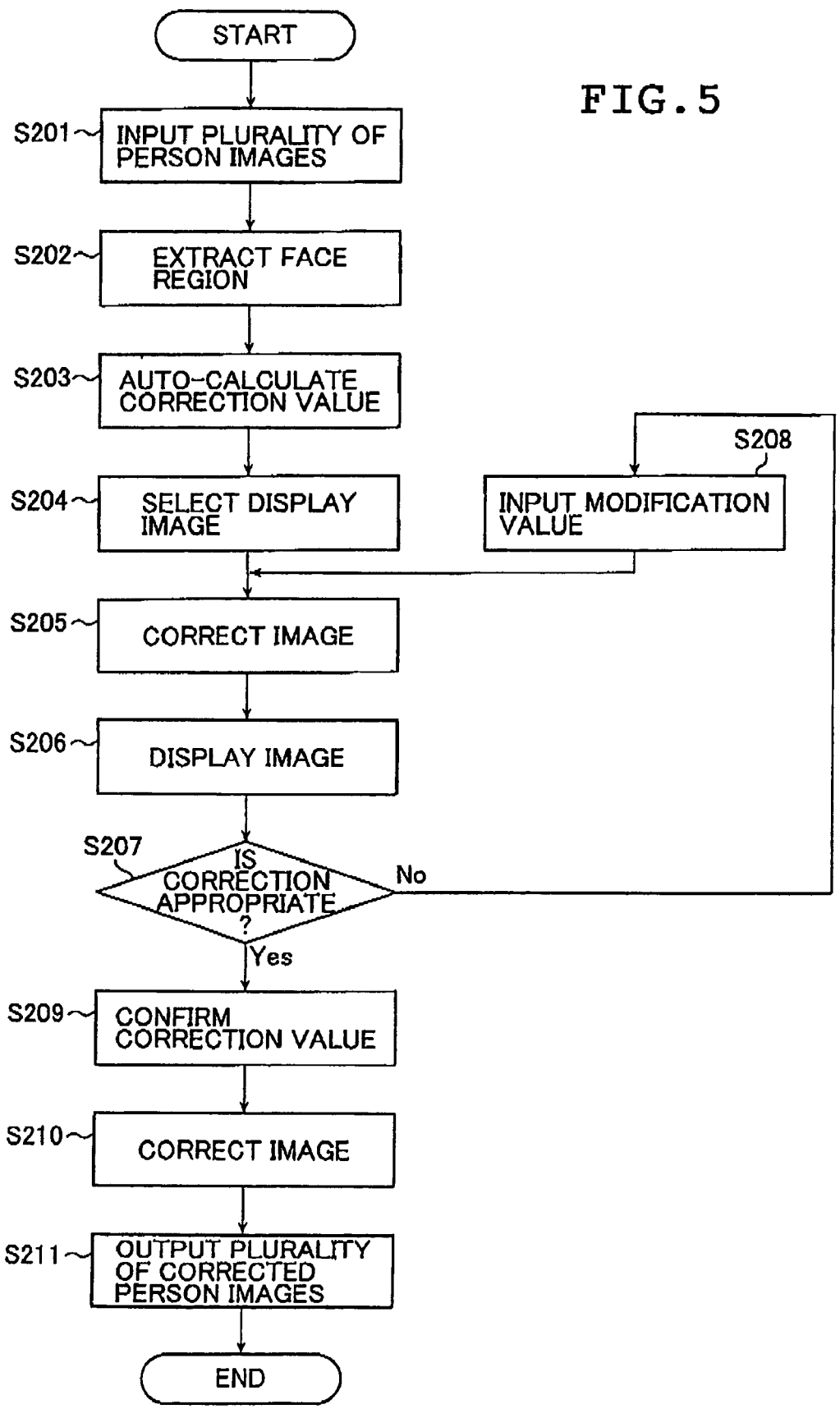
FIG. 5 is a flow chart illustrating person image correcting processing implemented in the person image correcting apparatus shown in FIG. 4.

Another embodiment of the person image correcting apparatus of the present invention will be described with reference to FIGS. 4 and 5. FIG. 4 is a block diagram showing another embodiment of the person image correcting apparatus according to the present invention, and FIG. 5 is a flow chart of the person image correcting process implemented in a person image correcting apparatus 40.

The person image correcting apparatus 40 shown in FIG. 4, similar to the above described person image correcting apparatus 10, when a plurality of person images (image data) shot under identical shooting conditions are inputted, carries out identical correction on the received plurality of personal images, and produces corrected person images (image data).

The person image correcting apparatus 40 has a similar configuration as in the above described example, with the exception that the person image correcting apparatus 40 further has a correction value auto-calculating unit 42 provided between the face region extracting unit 12 and an image correcting unit 44, and that the image correcting unit 44 uses data received from the correction value auto-calculating unit 42 to correct images.

In the person image correcting apparatus 40 in FIG. 4, components similar to those in the person image correcting apparatus 10 are denoted with the same numeric, and descriptions of such components are omitted. Following explanation will be given mainly for differences.

In the person image correcting apparatus 40, when a plurality of person images are inputted to the face region extracting unit 12 (step S201), the face region extracting unit 12 extracts face regions from the inputted plurality of person images respectively (step S202).

Then, the correction value auto-calculating unit 42 automatically calculates correction values (Dav, Cav, Mav, Yav) for correcting the inputted plurality of person images (step S203) based on the feature amount in the face regions extracted by the face region extracting unit 12.

Since the person images to be inputted in the person image correcting apparatus 40 are the images shot under identical shooting conditions, there may be cases where all the images are affected by the shooting conditions, for example, all the images are dark, or all the images are reddish. Accordingly, correction is required commonly for all of the images The correction values automatically calculated by the correction value auto-calculating unit 42 are intended to automatically perform such correction as commonly needed to all the images to a certain level, and to make the image data values close to predetermined target values.

While the correction value auto-calculating unit 42 can be used for calculating either one of color or density, in the description here, both color and density are calculated as an example, The correction value auto-calculating unit 42, first calculates correction values (Di, Ci, Mi, Yi) for each of the inputted plurality of personal images in the following manner.

First, a feature amount in the face region is calculated. For example, for the i-th person image, average values ($R_{fi}$, $G_{fi}$, $B_{fi}$) of the RGB data values in the face region are calculated.

The average values (Rfi, Gfi, Bfi) of the RGB data values in the face region are converted into linear luminance signals (lrfi, lgfi, lbfi) using formula (10) or (11) below. For example, if the input image data is 8 bit, values (Rfi, Gfi, Bfi) are obtained by dividing the average values of the RGB data values in the face region by 255, and formulas (10) and (11) below are used.

While formulas (10) and (11) are for obtaining lrfi from Rfi, in a similar way, lgfi, lbfi are obtained from Gfi, Bfi.

$$lrfi = \begin{cases} \left(\dfrac{Rfi + 0.055}{1.055}\right)^{2.4} & (Rfi \geq 0.04045) \quad (10) \\ \dfrac{Rfi}{12.92} & (Rfi < 0.04045) \quad (11) \end{cases}$$

On the other hand, predetermined target values (also referred to as "face target value") (Rft, Gft, Bft) for the face region are converted into linear luminance signals (lrft, lgft, lbft) by using above formula (10) or (11).

Next, using formula (12) below, correction gain values (gainRi, gainGi, gainBi) are calculated from (lrfi, lgfi, lbfi) obtained from the average values (Rfi, Gfi, Bfi) of the RGB data values in the face region, and (lrft, lgft, lbft) obtained from the face target values (Rft, Gft, Bft).

$$\left. \begin{array}{l} \text{gain } Ri = lrft/lrfi \\ \text{gain } Gi = lgft/lgfi \\ \text{gain } Bi = lbft/lbfi \end{array} \right\} \quad (12)$$

Then, from the obtained correction gain values (gainRi, gainGi, gainBi), correction values (Di, Ci, Mi, Yi) are calculated using formulas (13) and (14) below.

$$Di = (C + M + Y)/3 \quad (13)$$

$$\left. \begin{array}{l} Ci = C - Di \\ Mi = M - Di \\ Yi = Y - Di \end{array} \right\} \quad (14)$$

where, C=−log 10 (gainRi), M=−log10 (gainGi), and Y=−log10 (gainBi).

Upon completion of calculation of correction values for all the person images, all of the correction values of individual images are averaged to obtain correction values (Dav, Cav, Mav, Yav).

Generally, in calculating correction values automatically by using target values, if there are big differences between the face colors of the object and the target face colors, inappropriate correction values may be calculated. However, in this embodiment, even if faces having different skin colors are mixedly included in the images, extremely inappropriate values are prevented from being used, since the correction values (Dav, Cav, Mav, Yav) calculated by the correction value auto-calculating unit 42 are the average values of the correction values of all individual images (Di, Ci, Mi, Yi)

When correction values are automatically calculated in step S203, the display image selecting unit 14 selects display images (step S204). The process in step S204 is the same as in the above described example. The processes in step S203 and step S204 can be performed in parallel.

Figure 6:
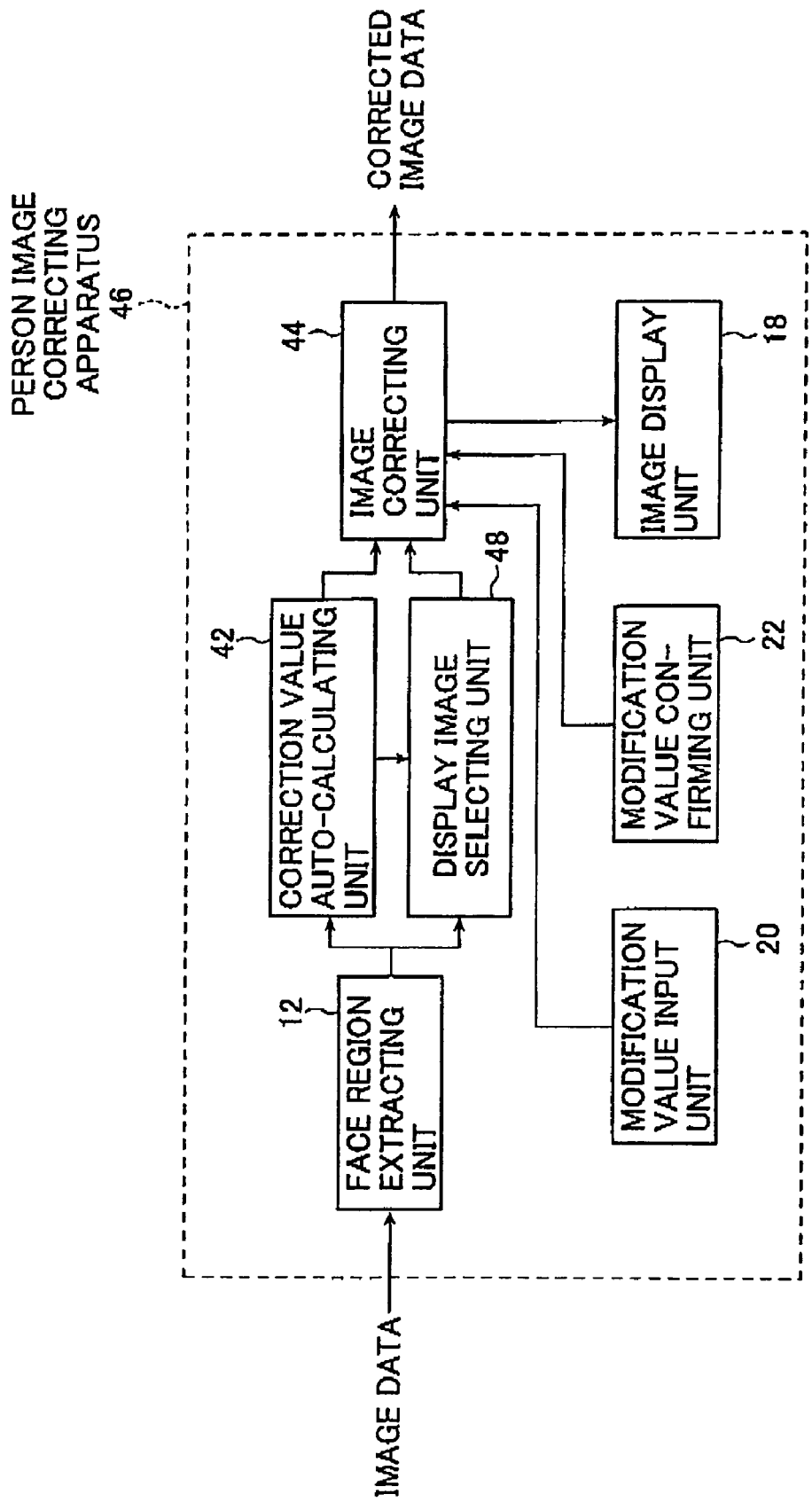
FIG. 6 is a block diagram showing another embodiment of the person image correcting apparatus according to the present invention.

As in another embodiment shown in FIG. 6, correction values (Dav, Cav, Mav, Yav) for all the images calculated by the correction value auto-calculating unit 42 and correction values (Di, Ci, Mi, Yi) for individual images may be supplied to the display image selecting unit 48, and used by the display image selecting unit 48 to select display images. In this case, as shown in FIG. 5, step S204 is performed after step S203.

In such configuration, the display image selecting unit 48 may use selection criteria shown in table 3 below. In the selection criteria shown in table 3, Ei is a value obtainable from formula (15) below.

$$Ei = \{(Di-Dav)^2 + (Ci-Cav)^2 + (Mi-Mav)^2 + (Yi-Yav)^2\}^{0.5} \quad (15)$$

TABLE 3

| No | Face | Selection Criteria |
|---|---|---|
| 1 | Most average face | Image having smallest Ei |
| 2 | Brightest face | Image having largest Di |
| 3 | Darkest face | Image having smallest Di |
| 4 | Most reddish face | Image having largest Ci |
| 5 | Most bluish face | Image having largest Yi |
| 6 | Most yellowish face | Image having smallest Yi |
| 7 | Most cyanish face | Image having smallest Ci |

In this way, the correction values (Dav, Cav, Mav, Yav) for all the images and the correction values (Di, Ci, Mi, Yi) for individual images that are calculated previously may be utilized, and the process in the display image selecting unit 48 is thus simplified.

When the display image is selected, the image correcting unit 44 uses the correction values (Dav, Cav, Mav, Yav) calculated by the correction value auto-calculating unit 42 and the modification values (D, C, M, Y) inputted by the modification value input unit 20 to correct the display image (step S205).

Figure 2:
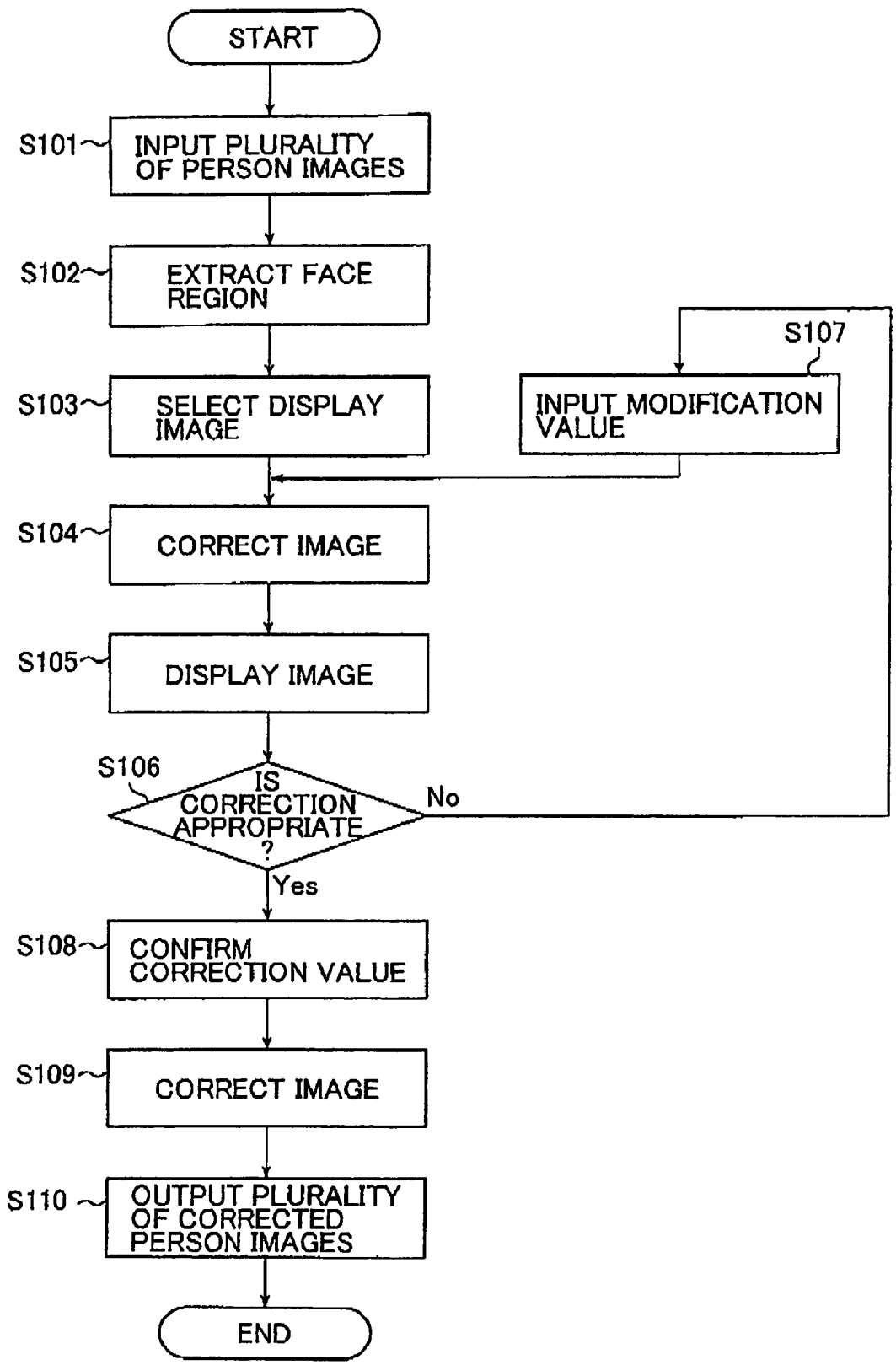
FIG. 2 is a flow chart illustrating person image correcting processing implemented in the person image correcting apparatus shown in FIG. 1.

Specifically, a similar image correcting method used in step S104 in FIG. 2 is used with the exception that the (gainR, gainG, gainB) calculated in formula (16) below are used instead of using the (gainR, gainG, gainB) calculated in formula (4).

$$\left. \begin{array}{l} \text{gain } R = 10^{\wedge}\{-\{Dav + Cav + (D+C) \times 0.01\}\} \\ \text{gain } G = 10^{\wedge}\{-\{Dav + Mav + (D+M) \times 0.01\}\} \\ \text{gain } B = 10^{\wedge}\{-\{Dav + Yav + (D+Y) \times 0.01\}\} \end{array} \right\} \quad (16)$$

In the same manner, for all of the pixels in respective display images, output data values (Rout, Gout, Bout) are obtained from the input data values (Rin, Gin, Bin), image correction is performed, and images that have been corrected (corrected display images) are displayed in the image display unit 18 (S206).

In this embodiment, since correction is performed on the images that are displayed first using the correction values automatically calculated in step S203, if the correction is appropriate in step S207, the modification values (initial values of zero) are confirmed (step S209).

If the correction is not appropriate, modification value inputting (step S208) is performed, followed by image correction (step S205) and image displaying (step S206). These steps are repeated until an instruction indicating the correction is appropriate is inputted.

When the modification values are confirmed, the image correcting unit 44 uses the confirmed modification values to correct all of the person images in the plurality of images that are inputted (S210), and outputs images that have been corrected (corrected image data) (S211).

Correction of the person images in the image correcting unit 44 in step S210 is performed in a similar manner as the correction of the display images in step S205, with the exception that the (gainR, gainG, gainB) calculated in formula (16) above are used, instead of using the (gainR, gainG, gainB) calculated in formula (4) in image correction in step S109 in FIG. 2.

Next, a preferred embodiment of the display image selecting unit in the person image correcting method according to the present invention will be described with reference to the person image correcting apparatus 10 in FIG. 1, as an example.

In the above described example, the display image selecting unit 14 has selected, in step S103 in FIG. 2, three person faces in terms of density, including the most average face, the brightest face, and the darkest face, and five faces in terms of color, including the most average face (reused) the most reddish face, the most bluish face, the most yellowish face, and the most cyanish face. In other words, among the image group, the most average image and the most extreme images are selected and displayed.

In contrast, in this embodiment, display images are selected based on distribution of face color or density.

Specifically, in step S103 in FIG. 2, the display image selecting unit 14, in the same manner as described above, first calculates the feature amount in respective face regions for all of the inputted plurality of person images. For example, for the i-th person image, the average values (Rfi, Gfi, Bfi) of RGB data values in the face region are calculated. Then, brightness Yfi of the face region is calculated using formula (17) below, which is the same as formula (1) above.

$$Yfi = 0.299 \times Rfi + 0.587 \times Gfi + 0.114 \times Bfi \quad (17)$$

Next, display images are selected based on the average values (Rfi, Gfi, Bfi) of RGB data value in the face region that are calculated as the feature amount, and the distribution of brightness Yfi.

Figure 7:
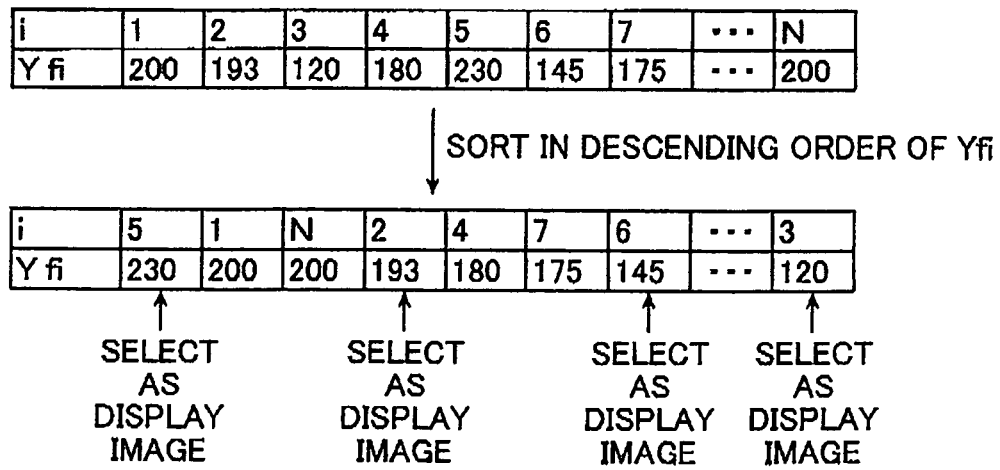
FIG. 7 is an explanatory chart showing an example of display image selection.

An exemplary method for selecting display images based on distribution of face brightness (density) includes a method, as shown in FIG. 7, in which the images are sorted in descending order of Yfi values and a predetermined number of images are selected with a certain interval. For example, if selecting 5 person images out of 13 person images in total in terms of distribution of brightness, images can be selected at every three images in descending order of Yfi.

In the same way, display images are selected in terms of color tint according to distribution. For example, a predetermined number of images are selected based on distribution of Rfi/Yfi and distribution of Bfi/Yfi.

In this way, the greater the number of bright faces in the image group, the more the images including bright faces are selected; the greater the number of dark faces in the image group, the more the images including dark faces are selected; and the greater the number of average faces in the image group, the more the images including average faces are selected and displayed on the monitor of the image display unit 18.

Also, in terms of colors, display images that reflect color biases in the image group are selected and displayed.

In this way, selection of images is performed according to distribution of density and color of the faces in the image group. In other words, display images are selected so as to represent actual distribution in the image group with a reduced number of images. This can provide the operator with useful information in inputting modification values, and improve efficiency in determining modification values.

When the image display unit 18 displays the images thus selected (step S105 in FIG. 2), the display images that have gone through correction may be simply arranged on the display screen, or preferably be arranged in such a manner that relationship among them can easily be identified.

Figure 8:
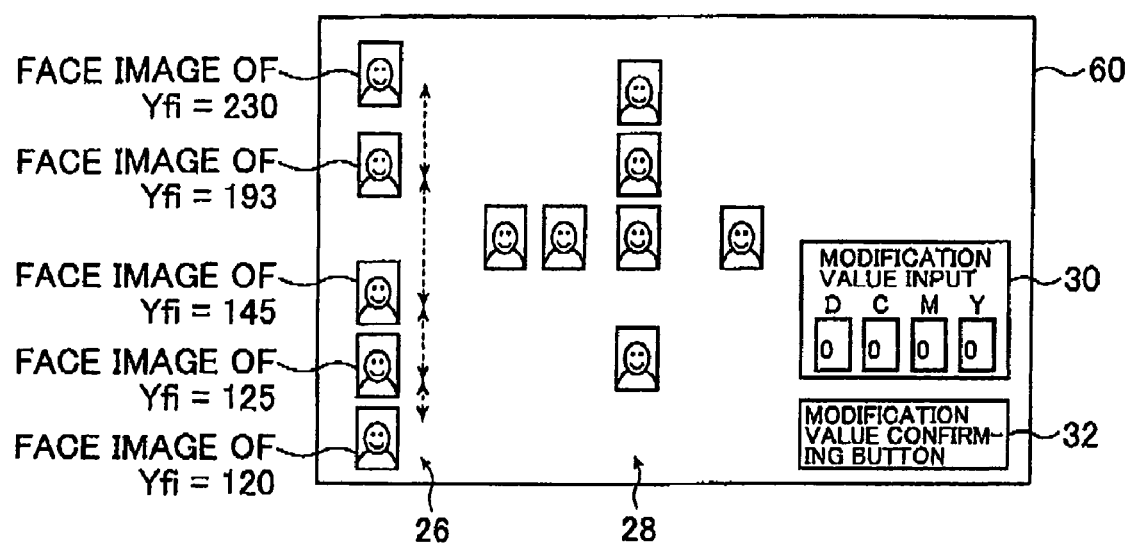
FIG. 8 is a schematic view showing an example of a display screen.

In other words, for example, with respect to brightness of the faces, it is preferable to arrange the images in descending order of brightness, and it is also preferable to arrange the images with different intervals to show distribution relationship, as in an display screen 60 shown in FIG. 8.

Specifically, as shown in FIG. 8, if 5 images are selected based on distribution of brightness, and if the images have Yfi values of 230, 193, 145, 125, and 120 respectively, the images are arranged on a display screen 60 with a set of display intervals of 37:48:20:5. In the example in FIG. 8, the images are arranged in the first display region 26 of the display screen 60 with a set of intervals of 37:48:20:5 in the vertical direction.

Displaying in this way can give an instant indication that the inputted images have a relatively high distribution in dark images in this example, providing significantly useful information in determining modification values.

Again in terms of color tint, determining display positions according to distribution can give an instant indication of distribution which in turn provides significantly useful information in determining modification values.

Accordingly, the modification value determining process can be more efficient.

Next, description will be given on still another embodiment of the person image correcting apparatus of the present invention.

As already described, it is preferable to perform identical correction for the plurality of person images shot under identical shooting conditions. However, if distribution of density or color tint of the faces is widely spread, there may be cases where it is difficult to correct all the images appropriately, whatever modification values are applied. In such cases, the images can be segmented into a plurality of image groups and different modification values may be applied for the respective image groups.

Figure 9:
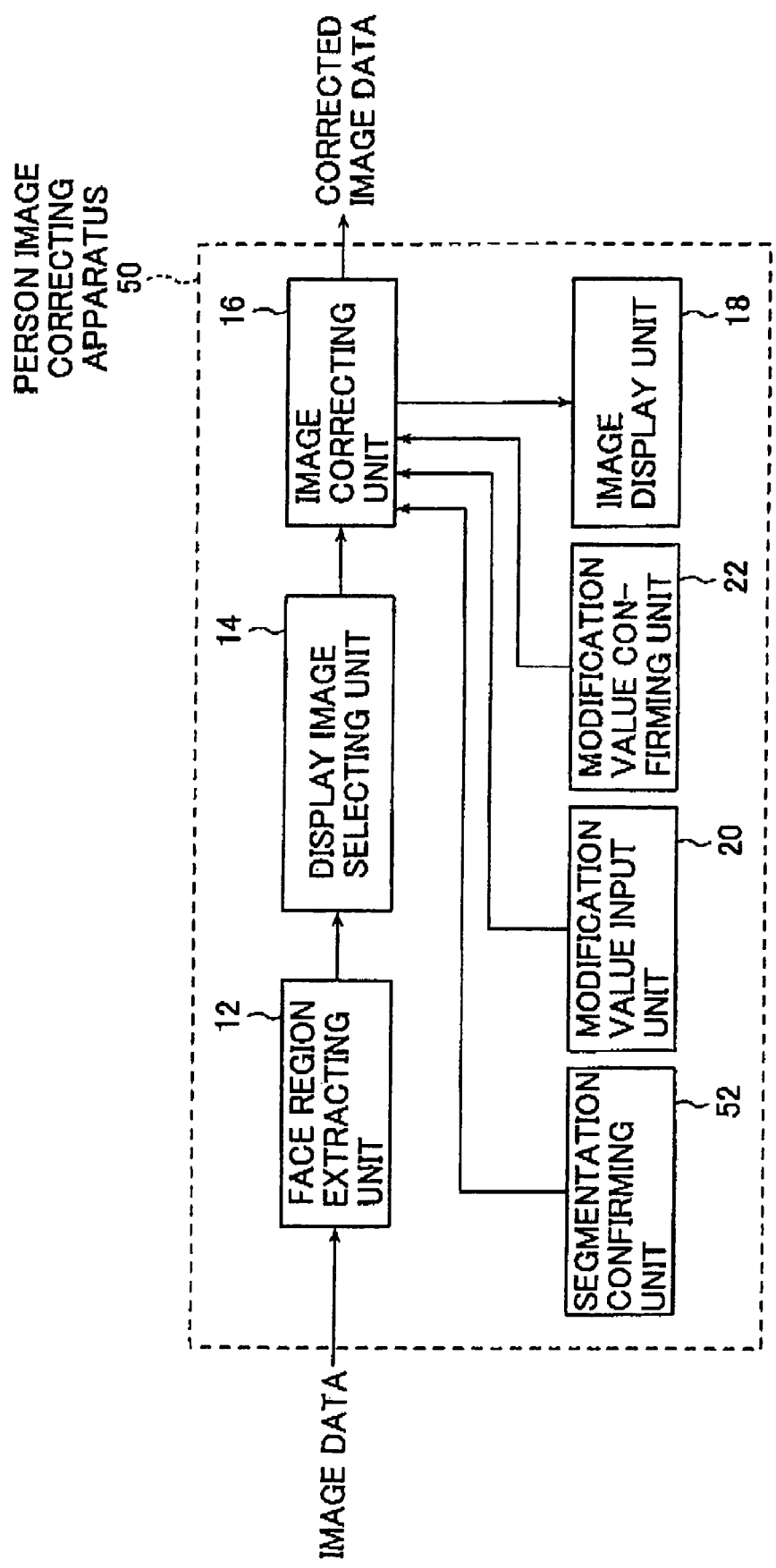
FIG. 9 is a block diagram showing another embodiment of the person image correcting apparatus according to the present invention.

Specifically, as in a person image correcting apparatus 50 shown in FIG. 9, a segmentation confirming unit 52 is additionally provided on the same configuration as in the person image correcting apparatus 10 in FIG. 1. The segmentation confirming unit 52 has a similar input unit as used in the modification value input unit 20, and the modification value confirming unit 22.

Figure 10A:
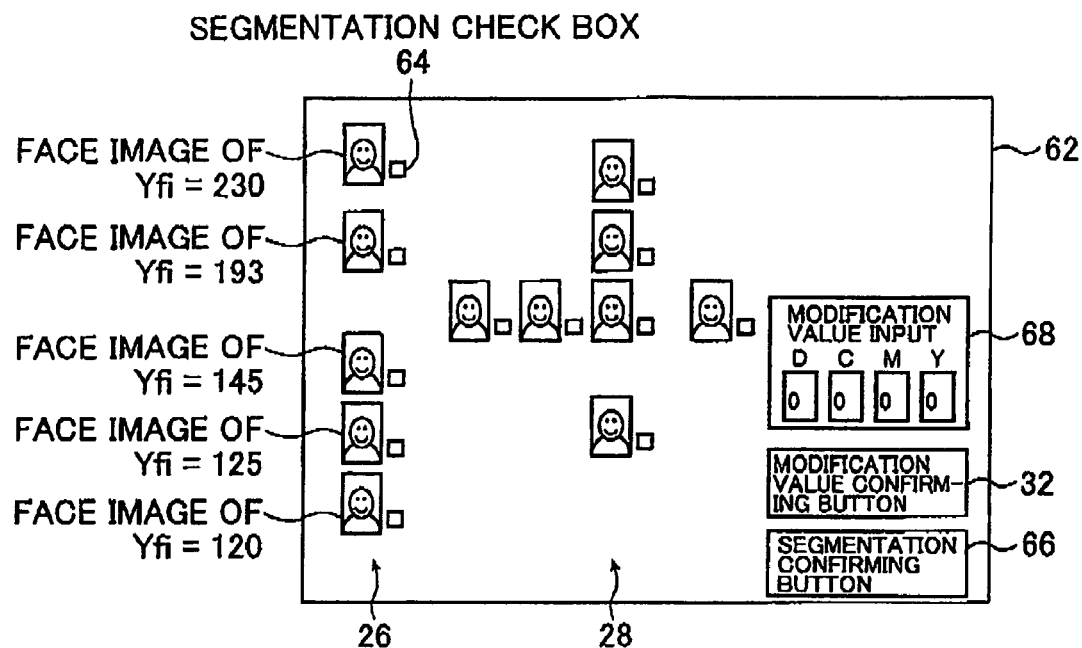
FIGS. 10A and 10B show examples of a display screen.

In an image display unit 18 of the person image correcting apparatus 50, a display screen 62 has segmentation check boxes 64 arranged near the respective display images as shown in FIG. 10A. Also provided are a modification value input display section 68 with segment switching buttons and a segmentation confirming button 66.

Modification value input step to be processed in the above described person image correcting apparatus 50, corresponding to step S107 in the flow chart in FIG. 2, will be described below.

For example, in order to segment the images into images having bright faces and images having dark faces, check boxes for the two images of Yfi=193 and Yfi=230 are checked through the segmentation confirming unit 52 by the operator. When the segmentation confirming button 66 is depressed, the images are segmented, using Yfi=193 as a boundary, into image group A of Yfi<193 and image group B of Yfi≧193.

This allows different modification values to be inputted for the image group A and the image group B.

Figure 10B:
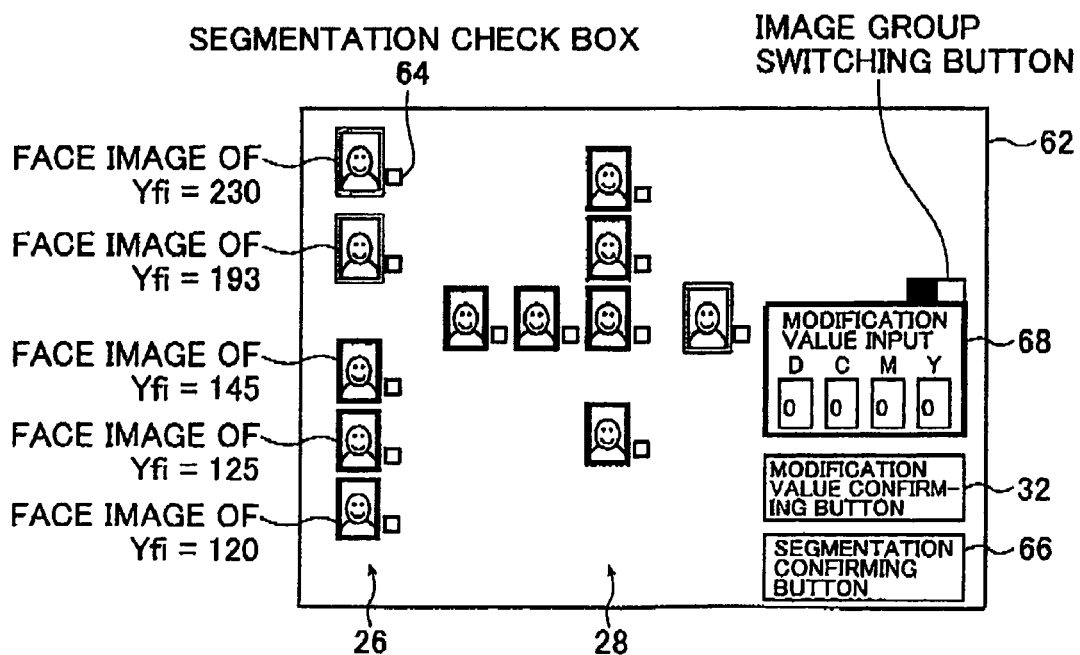

When the images are segmented, as shown in FIG. 10B, the image display unit 18 displays the image groups on the display screen 62 in such a manner that the segmented image groups are clearly identified and segmentation switching buttons of the modification value input display section 68 are displayed.

For example, the image display unit 18 displays the images in such a manner that the images in the same image group are framed with the same color, and the color of the frame of the modification value input display section 68 is changed on each image group basis. This allows easy identification among different image groups, and clear indication which image group to input modification values.

The operator inputs modification values to each image group by operating the image group switching button of the modification value input display section 68 through the segmentation confirming unit 52 to switch among image groups. In this case, only the display images of the selected image group are corrected by the inputted modification values.

In this way, modification values can be determined individually for each of the plurality of image groups, with considering the balance on each image group basis.

The display images in each image group may be reselected according to distribution of density or color tint of the faces in the image group and displayed.

The person image correcting apparatus and the person image correcting method of the present invention have been described in detail heretofore. However, it should be noted that the present invention is not limited to the embodiments described above, and any improvements and modifications may be incorporated unless otherwise such modification and improvements depart from the scope of the invention.

What is claimed is:

1. A person image correcting apparatus for correcting a plurality of person images that are shot under identical shooting conditions, the person image correcting apparatus comprising:
   a face region extracting unit for extracting a face region of the person images that are inputted;
   a display image selecting unit for automatically selecting two or more display images out of the plurality of person images, based on a feature amount in the face region extracted by the face region extracting unit;
   a segmentation confirmation unit for dividing the display images and the person images into two or more groups by using, as a boundary, the feature amount corresponding to an instruction inputted,
   a modification value input unit for receiving input of modification values of at least one of color and density for the respective display image groups divided by the segmentation confirming unit;
   a modification value confirming unit for receiving confirmation of the modification values for the respective display image groups divided by the segmentation confirming unit;
   an image correcting unit for correcting each of display images in the corresponding divided display image group using the modification values inputted from the modification value input unit, and for correcting each of person images in the corresponding divided person image group using the modification values confirmed by the modification value confirming unit so that the person images that have been corrected are generated; and
   an image display unit for displaying the display images corrected by the image correcting unit.

2. The person image correcting apparatus according to claim 1, further comprising,
   a correction value auto-calculating unit for automatically calculating correction values of at least one of color and density based on a feature amount of the face region extracted by the face region extracting unit,
   wherein the image correcting unit uses the correction values calculated by the correction value auto-calculating unit and the modification values inputted by the modification value input unit to correct the display images and the person images.

3. The person image correcting apparatus according to claim 1, wherein the display image selecting unit uses the feature amount in the face regions to select two or more display images that are different in density or color in the face regions, and
   the image display unit displays the display images in such a manner that the display images are arranged in an order of density or color.

4. A person image correcting method comprising the steps of:
   inputting a plurality of person images that are shot under identical shooting conditions;
   extracting a face region for each of the inputted plurality of person images;
   selecting two or more display images out of the plurality of person images based on a feature amount in the extracted face region;
   dividing the display images and the person images into two or more groups using, as a boundary, the feature amount corresponding to the input instruction;
   correcting each of display images in the corresponding divided display image group by using modification values of at least one of color and density that are inputted for each of the divided display image groups;
   displaying, on an image display unit, the display images that have been corrected;
   in response to an instruction of confirmation of the modification values, correcting each of person images in the corresponding divided person image group by using the modification values; and
   outputting the person images that have been corrected.

5. The person image correcting method according to claim 4, further comprising the step of,
   calculating correction values of at least one of color and density based on a feature amount of the extracted face region,
   wherein the steps of correcting the display images and correcting the plurality of person images use the correction values and the modification values to correct the display images and the person images.

6. The person image correcting method according to claim 4,
   wherein the step of selecting the display images uses a feature amount in the face regions to select two or more display images that are different in density or color in the face regions, and,
   wherein the displaying step displays the display images on an image display unit in such a manner that the display images are arranged in an order of density or color.

* * * * *